US008118219B2

(12) United States Patent
Monk

(10) Patent No.: US 8,118,219 B2
(45) Date of Patent: Feb. 21, 2012

(54) SYSTEM AND METHOD FOR PROCESSING EXPIRATION DATES FOR PREPAID CARDS

(75) Inventor: Justin T. Monk, Parker, CO (US)

(73) Assignee: Visa USA Inc., San Francisco, CA (US)

( * ) Notice: Subject to any disclaimer, the term of this patent is extended or adjusted under 35 U.S.C. 154(b) by 493 days.

(21) Appl. No.: 12/248,103

(22) Filed: Oct. 9, 2008

(65) Prior Publication Data
US 2010/0019030 A1    Jan. 28, 2010

Related U.S. Application Data

(60) Provisional application No. 61/083,311, filed on Jul. 24, 2008.

(51) Int. Cl.
*G06K 5/00* (2006.01)
(52) U.S. Cl. ........ 235/380; 235/383; 235/385; 235/487; 705/16
(58) Field of Classification Search .................. 235/380, 235/385, 487, 383; 705/14, 16
See application file for complete search history.

(56) References Cited

U.S. PATENT DOCUMENTS

| 6,901,387 | B2 * | 5/2005 | Wells et al. ...................... 705/64 |
| 7,600,674 | B1 * | 10/2009 | Marah et al. .................. 235/380 |
| 2005/0080693 | A1 * | 4/2005 | Foss et al. ....................... 705/30 |
| 2006/0155643 | A1 | 7/2006 | Shuman et al. |

FOREIGN PATENT DOCUMENTS

| JP | 2006114057 | 4/2006 |
| KR | 2002-0004010 | 1/2002 |
| WO | WO 01/41036 A1 | 6/2001 |

OTHER PUBLICATIONS

International Search Report for application PCT/US2009/051463 dated Apr. 1, 2010.
Written Opinion for application PCT/US2009/051463 dated Apr. 1, 2010.
International Preliminary Report on Patentability for application PCT/US2009/051463 issued Jan. 25, 2011.

* cited by examiner

*Primary Examiner* — Kristy A Haupt
(74) *Attorney, Agent, or Firm* — Chadbourne & Parke LLP; Walter G. Hanchuk

(57) ABSTRACT

A prepaid card processing system is operable for processing customized expiration dates of prepaid cards. The prepaid card processing system includes a database for storing program expiration parameters associated with an issuer prepaid card program; a set of card accounts created under the issuer prepaid card program, wherein each card account has an expiration date for a prepaid card associated with the card account; and one or more customized expiration parameters for the set of card accounts. The prepaid card processing system is operable to determine the expiration date for the prepaid card associated with the card account based on the program expiration parameters and the customized expiration parameters for the set of card accounts.

28 Claims, 8 Drawing Sheets

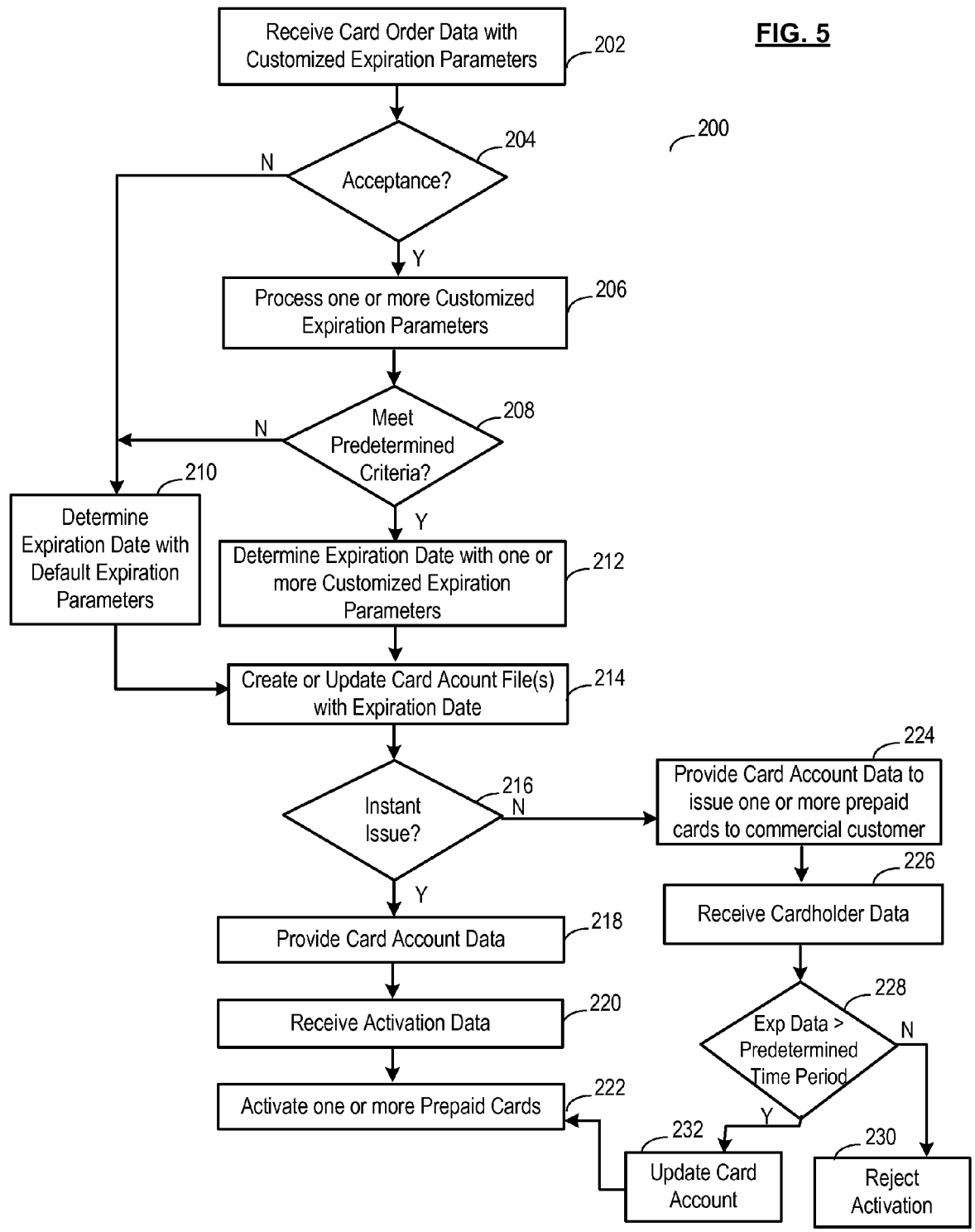

SYSTEM AND METHOD FOR PROCESSING EXPIRATION DATES FOR PREPAID CARDS

CROSS-REFERENCE TO RELATED PATENTS

The present U.S. Utility patent application claims priority pursuant to 35 U.S.C. §119(e) to U.S. Provisional Application Ser. No. 61/083,311 entitled "System and Method for Processing Expiration Dates for Prepaid Cards," filed Jul. 24, 2008, pending, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to systems and methods for processing of prepaid cards and more particularly to processing expiration dates for prepaid cards.

2. Description of Related Art

Many consumers lack access to a credit card or are without a banking account. Prepaid cards are one solution for such consumers. Prepaid cards are funded with a specific monetary value at issuance and can be used similarly to credit cards to purchase goods and services and to access cash with the funded monetary value.

Different types of prepaid cards are currently offered in the marketplace. For example, one type of prepaid card is a "stored value prepaid card". A stored value prepaid card is issued by an issuer to a cardholder and is enrolled under the cardholder's name. The stored value prepaid card is pre-funded by the cardholder with a specific monetary value. The stored value prepaid card may be reloadable with additional funds by the cardholder that is added to the balance of the card or alternatively, may be non-reloadable or disposable, such that additional funds cannot be added to the balance of the card. Stored value prepaid cards are advantageous for consumers who are unable to obtain a credit card or do not want a credit card but still want the convenience of being able to purchase goods and services and access cash without the use of checks.

Another type of prepaid card is an "open system prepaid card" such as a payroll prepaid card. Payroll prepaid cards are provided by employers to compensate employees. The employee is issued a card that permits access to an account established by the employer. Each pay period, the employee's earned funds are automatically loaded onto the card and available on payday—similar to direct deposit. The payroll prepaid card may also be used to pay bonuses or other compensation to employees. A payroll prepaid card is particularly useful for employees who do not have a regular checking or savings account. Commercial entities may also want to use an open system prepaid card for non-employees as well, such as to provide payments to vendors, pay insurance claims, provide emergency disaster relief, loyalty programs, annuities and customer refunds. In addition, consumers may want to provide an open system prepaid card for a third party. For example, parents may want to provide their children with an open system prepaid card such that the parents may control the funds spent with the prepaid card.

Another type of prepaid card is a "closed system prepaid card" and is commonly known as a "gift card". A merchant offers customers a gift card to be purchased for a fixed amount or provides a gift card to customers as an incentive. The gift card is then pre-funded with the specific dollar amount and can only be used at the merchant that provided the card. The merchant may register the name of the cardholder when the gift card is provided to the customer. Generally, gift cards are not reloadable.

Other types of prepaid cards are also available, such as Government Prepaid Cards, Travel prepaid cards, etc. Each type of prepaid card is pre-funded with a specific dollar amount and may be either reloadable or non-reloadable.

To provide prepaid cards to a customer, an issuer first establishes a prepaid card program with a prepaid card processing system. The issuer communicates certain default prepaid card program options and services to a prepaid card processing system for processing and storage. Then, any prepaid card issued by the issuer under the prepaid card program is configured with the default options by the prepaid card processing system. These default options may not be customized for a specific customer or order. Since the customer or issuer has no flexibility in overriding the default options determined at the prepaid card program level, these default options may not be customized for a specific customer or order. However, with so many different types of customers and uses for a prepaid card, more flexibility may be desired by the issuer and/or customer, especially with respect to the expiration options for a prepaid card. Therefore, a need exists for a more flexible prepaid card processing system that is operable to process customized expiration options for prepaid cards.

BRIEF DESCRIPTION OF THE SEVERAL VIEWS OF THE DRAWING(S)

FIG. 5 is a logic diagram of an embodiment of a method for processing custom expiration parameters in accordance with the present invention;

DETAILED DESCRIPTION OF EMBODIMENTS OF THE INVENTION

Figure 1:
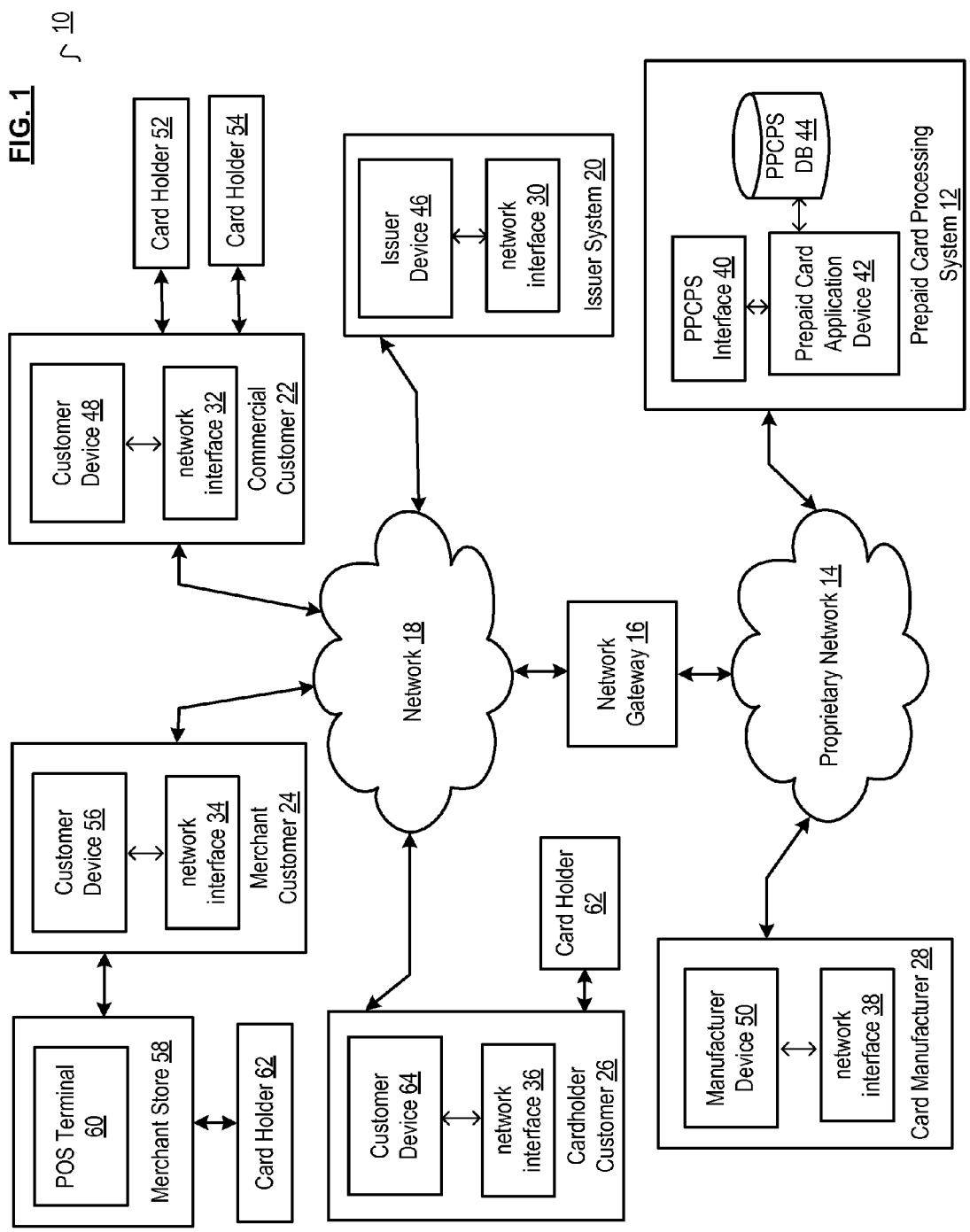
FIG. 1 is a schematic block diagram of an embodiment of a system operable to process custom expiration parameters for prepaid cards in accordance with the present invention.

FIG. 1 is a schematic block diagram of an embodiment of a system operable to process custom expiration parameters for prepaid cards in accordance with the present invention. The system 10 includes a prepaid card processing system 12, proprietary network 14, network gateway 16, network 18, an issuer system 20, customer systems 22, 24, 26 and card manufacturer system 28. In an embodiment, the prepaid card processing system 12 and the issuer system 20 are operated and maintained as separate systems by different legal entities. In another embodiment, the prepaid card processing system 12 and the issuer system 20 are operated and maintained as one card processing and issuance system owned by a single legal entity or owned by a parent and/or its subsidiary legal entities.

In an embodiment, the prepaid card processing system 12 communicates with the issuer system 20 through a network 18, network gateway 16 and proprietary network 14. The proprietary network 14 includes one or more interconnected networks, having one or more network nodes, such as routers, switches, gateways, bridges, hubs, switches and other network nodes that are managed by one or more network management systems to provide secure channels of communication using one or more network protocols. In an embodiment, the proprietary network 14 is VisaNet™ or a similar proprietary network. The prepaid card processing system 12 and the proprietary network 14 may be operated and maintained by a single entity or owned by a parent and/or its subsidiary legal entities. For example, Visa, Inc. operates and maintains its VisaNet™ proprietary network and a VISA™ prepaid card processing system. In another embodiment, the prepaid card processing system 12 and the proprietary network 14 are owned and operated by different legal entities.

The network 18 provides access to the proprietary network 14 through the network gateway 16. The network 18 may be a wide area network, such as the internet or an access network or another proprietary network that connects devices to the proprietary network 14 through the network gateway 16. The network gateway 16 may be one or more edge network nodes that control access to the proprietary network 14 and may also provide firewall and routing services to the proprietary network 14 to ensure only authorized communications are transmitted in the proprietary network 14.

The issuer system 20 communicates to one or more customer systems, such as customer systems 22, 24, 26 through the network 18. The issuer system 20 and each customer system 22, 24, 26 and manufacturer system 28 include network interfaces 30, 32, 34, 36 and 38. The network interfaces 30, 32, 34, 36 and 38 provide network access for the customers and manufacturer systems. The network interfaces 30, 32, 34, 36 and 38 may include gateways, proxy servers, modems, network terminals and other devices that are operable to provide communication between the issuer system 20 and the customer system 22, 24, 26 through the network 18. In another embodiment, the network interfaces 30, 32, 34, 36 and 38 may be operable to provide communications between the issuer system 20 and the customer systems 22, 24, 26 through the network gateway 16 and the proprietary network 14.

The prepaid card processing system 12 includes a prepaid card processing system (PPCPS) interface device 40 that interfaces with the proprietary network 14 to communicate with the issuer system 20 and customer systems 22, 24, 26 and manufacturer system 28. In an embodiment, the PPCPS interface device 40 includes a server, such as a web or file server, that is operable to communicate using the Hyper Text Transfer Protocol (HTTP) protocol, File Transfer Protocol (FTP) or other protocol operable to communicate data, such as Hypertext Markup Language (HTML) documents, text, images, audio, videos or some other type of file. The PPCPS interface device 40 in an embodiment may transmit dynamic content generated by it or by the prepaid card application device 42. The PPCPS interface device 40 in an embodiment also includes firewall or authentication capability that requires password or other authentication data prior to allowing access to some or all of the resources of the prepaid card processing system 12. The PPCPS interface device may also include gateways, proxy servers, modems, network terminals and other devices that are operable to provide communication.

The prepaid card processing system 12 includes a prepaid card application device that is operable to perform functions described herein to process prepaid cards. The prepaid card processing system 12 also includes a PPCPS database 44. The database 44 may be one or more databases implemented in internal memory devices, storage area networks, network attached storage devices, or other storage devices located in one geographical location or multiple geographical locations. The database 44 may be structured as relational, network, hierarchal or object based or other type of structured database operable to store and locate data files.

The issuer system 20 includes the network interface 30 and the issuer device 46. The issuer device 46 in an embodiment includes a web browser for receiving and sending data to the PPCPS interface device 40. In addition, the issuer device 46 or network interface 30 may include a web server as well for communicating data with customers 22, 24 and 26 over network 18. The issuer device 46 also includes a memory, either internal or external, and processing module that are operable to perform functions described herein to issue prepaid cards.

To establish a prepaid card program, the issuer system 20 communicates information about a prepaid card program to the prepaid card processing system 12. A prepaid card issued in accordance with the program includes a stored value prepaid card, an open system prepaid card, a closed system prepaid card, either reloadable or disposable, such as travel card, payroll card, teen or student prefunded card, commercial prepaid card, gift card, electronic payment account and any other type of preloaded or prefunded card or account, in any type of physical or electronic form, including a plastic card, smart card, microchip, wireless device, electronic fund account, etc. An issuer is a bank, financial institution or other entity that issues a prepaid card to commercial entities or consumers.

The information about the prepaid card program also includes program expiration parameters. Upon receipt, the prepaid card processing system 12 creates an issuer card program file for the issuer prepaid card program with the program expiration parameters and stores the issuer card program file in the database 44. The program expiration parameters define default expiration parameters for determining expiration dates of prepaid cards issued under the prepaid card program. In addition, the program expiration parameters indicate whether one or more customized expiration parameters are accepted under the issuer prepaid card program. The issuer card program file may also include other data needed for establishing the issuer prepaid card program with the prepaid card processing system 12.

Once the prepaid card program is established, an issuer is operable to issue prepaid cards to its customers for use by cardholders. A cardholder includes but is not limited to an individual consumer or commercial entity issued a prepaid card or batch of prepaid cards or authorized to use a prepaid card. The issuer system 20 may communicate and issue cards to various types of customers. For example, one type of customer is a commercial customer 22. The commercial customer system 22 includes network interface 32 and customer device 48. The customer device 48 in an embodiment includes a web browser for receiving and sending data to the issuer system 20 or to the prepaid card processing system 12. The customer device 48 also includes a memory, either internal or external, and processing module that are operable to perform functions described herein.

In an embodiment, the commercial customer system 22 receives input from a user for a prepaid card order for a prepaid card or a plurality of prepaid cards. In an embodiment, the prepaid card order may be received using a web browser running on the customer device 48 that accesses a prepaid card order graphical user interface (GUI) program, such as HTML documents, downloaded from a web server at either the issuer system 20 or prepaid card processing system 12. In another embodiment, the prepaid card order data may be received using another type of program, such as a spreadsheet or other specialized program, and processed by the commercial customer system 22 to create a data file. The data file would have a known format to the prepaid card processing system 12 for prepaid card order data.

The prepaid card order may include an order for one or more prepaid cards. It may include other data, such as to identify the issuer, customer, prepaid card program, shipping address for the prepaid cards, etc. The prepaid card order may include cardholder data or the cardholder data may be provided at a later time. The prepaid card order may also include one or more customized expiration parameters.

In an embodiment, the commercial customer system 22 transmits the prepaid card order to the issuer system 20. The issuer system 20 receives the prepaid card order and then transmits some or all of the data from the prepaid card order to the prepaid card processing system 12. In another embodiment, the commercial customer system 22 may access the prepaid card processing system 12 and transmit the prepaid card order to the prepaid card processing system 12 without first transmitting it to the issuer system 20.

When the prepaid card processing system 12 receives the prepaid card order, it creates and stores a card order file in the database 44. The prepaid card processing system 12 also determines an expiration date according to the one or more customized expiration parameters when accepted by the program expiration parameters. When determining the expiration date, the one or more customized expiration parameters, that are accepted, override the default expiration parameters from the prepaid card program file. The expiration date will apply to any prepaid cards that are part of the prepaid card order. The prepaid card processing system 12 creates a set of card accounts for the prepaid card order in the database 44. For example, if the prepaid card order includes a request for one prepaid card, the set of card accounts created includes one card account. If the prepaid card order includes a request for a plurality of cards, the set of card accounts includes a plurality of card accounts such that one card account is created for each prepaid card in the plurality of prepaid cards. The same expiration date for each prepaid card in the prepaid card order is stored in each card account file.

The card account file for each prepaid card is transmitted by the prepaid card processing system 12 to the issuer system 20 for processing and acceptance. When accepted, the issuer system issues the prepaid card and may also establish a card bank account for each card account file, if not already created. In an embodiment, when acceptance is received by the prepaid card processing system 12, card manufacturing information for card accounts with a physical prepaid card is transmitted by the prepaid card processing system 12 to a card manufacturer system 28. The card manufacturer system 28 includes a network interface 38 and manufacturer device 28. The manufacturer device 28 includes a memory, either internal or external, and processing module 50 that are operable to process the card manufacturing information to fabricate each prepaid card in accordance thereof. The prepaid card or cards from the prepaid card order is shipped to the shipping address indicated in the prepaid card order.

In an embodiment, if the card order includes a shipment address to the commercial customer 22 and did not include cardholder data, then the prepaid cards in the order are considered "instant issue" type prepaid cards. The instant issue prepaid cards are issued to a commercial customer 22. The commercial customer 22 must transmit cardholder data to be associated with each prepaid card account to register or enroll the cardholders with the card processing module 12. When the cardholder data is received by the card processing module 12, the card processing module 12 will store the cardholder data in the card account file associated with the prepaid card and activate the prepaid card. The commercial customer 22 prefunds the card bank accounts established by the issuer system 20. The commercial customer 22 distributes the prepaid cards to each respective cardholder, such as cardholders 52, 54, for use. In another embodiment, cardholder data and shipping address for the cardholder is provided in the prepaid card order. Such prepaid cards are considered "mail order or .CSV" type prepaid cards and must be activated by the cardholder prior to use.

In an embodiment, the commercial customer 22 is an employer and the prepaid card order is for payroll cards for employees. Each employee receives a prepaid payroll card. Each pay period, the employee's earned funds are automatically deposited into the card bank accounts in the issuer system 20 on payday-similar to direct deposit.

In another embodiment, the commercial customer is a merchant customer 24 with a merchant customer system. The merchant customer system 24 includes a network interface and customer device 56. The customer device 56 is similar to the customer device 48 such that it is operable to receive input from a user for a prepaid card order for one or more prepaid cards. The prepaid card order also includes customized expiration parameters that are transmitted to the prepaid card processing system 12. In this embodiment, the prepaid cards may be gift cards to be purchased or provided by the merchant customer 24 at one or more retail stores 58. In this embodiment, instant issue type gift cards may be ordered and shipped to the merchant stores 58. When a customer purchases the gift card, cardholder data for the cardholder 62 to be associated with a prepaid card is collected and transmitted by a POS terminal 60 in the merchant stores to the merchant customer system 24. The merchant customer system 24 transmits the cardholder data to be associated with a prepaid card to the prepaid card processing system 12. When received by the prepaid card processing system 12, the card account file is updated and the gift card may be activated, either by the cardholder or by the POS terminal 60.

In another embodiment, a customer is an individual consumer customer 26 having a consumer customer system 26. The consumer customer system 26 includes a network interface and customer device 56. The customer device 56 is similar to the customer device 48 and 56 such that it is operable to receive input from a user for a prepaid card order for one or more prepaid cards. In an embodiment, the customer device in general includes a web browser that accesses through the network interface 36 a web server of the issuer system 20. The customer system 26 transmits a prepaid card order that also includes customized expiration parameters that are transmitted to the prepaid card processing system 12.

Figure 2:
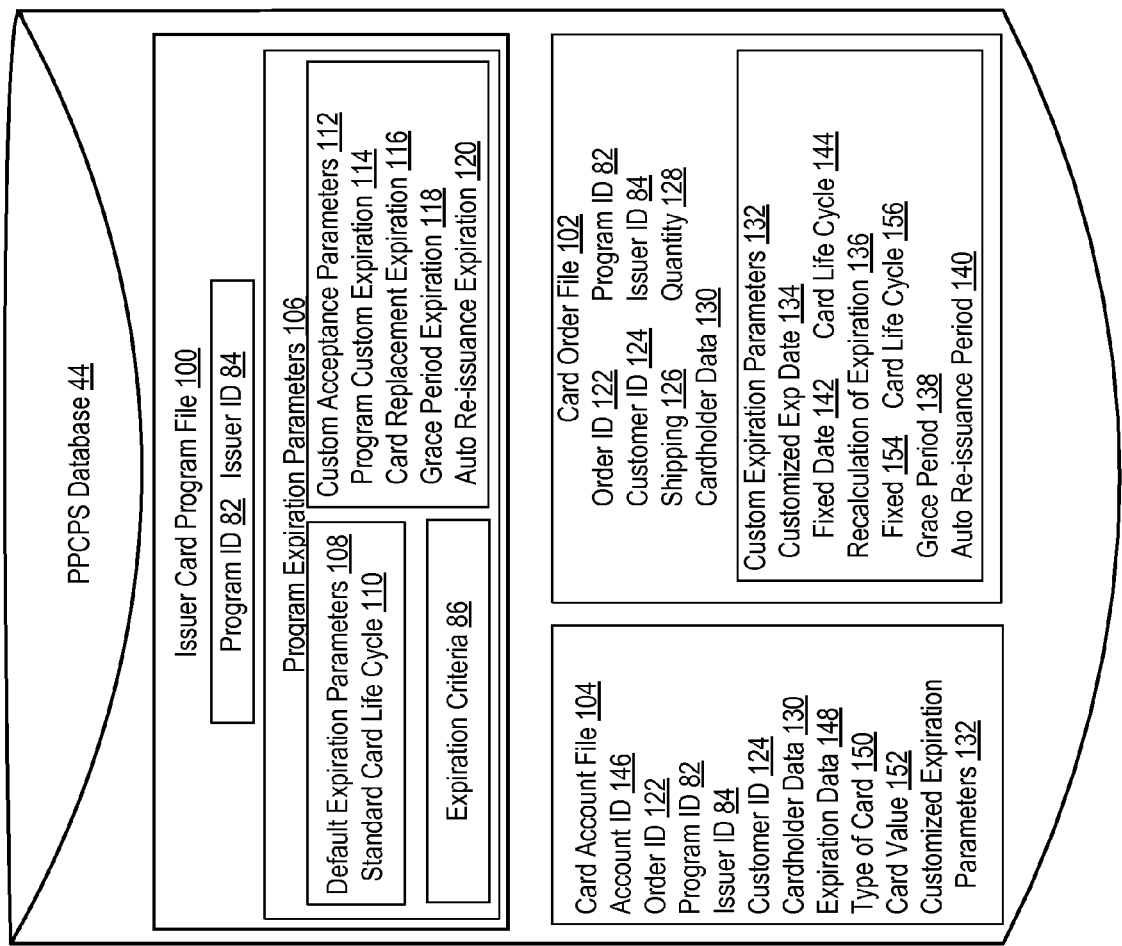
FIG. 2 is a schematic block diagram of an embodiment of a database in a prepaid card platform in accordance with the present invention.

FIG. 2 is a schematic block diagram of an embodiment of the database 44 in accordance with the present invention. FIG. 2 illustrates the type of information that may be stored by the prepaid card processing system 12 in database 44 in an embodiment of the invention. When an issuer card program is established, the prepaid card processing system 12 stores information about the issuer card program in the database 44. This information is illustrated by the issuer card program file 100. The issuer card program file 100 includes a program identification 82 and an issuer identification 84.

In addition, the issuer card program file 100 includes program expiration parameters 106 for the issuer prepaid card program file 100. The program expiration parameters 106 include default expiration parameters 108. The default expiration parameters 108 are used to determine the default expiration date of a prepaid card issued under the issuer card program. The default expiration parameters 108 only include a standard card life cycle 110 that defines a time period, such as 6 months, 12 months or 18 months, from the issue or activation date of a prepaid card to the expiration date of the prepaid card. The default expiration parameters 108 may include more than one standard life cycle 110. For example, the standard life cycles 110 in the default expiration parameters 108 may be 6 months, 12 months or 18 months. In known systems, an issuer or customer may only select expiration options from the default expiration parameters 108. The default expiration parameters 108 provide little flexibility to an issuer or customer to change the expiration date for a prepaid card order since the expiration date for the prepaid card order may only be determined by a standard life cycle 110 defined by the default expiration parameters 108. In addition, the default expiration parameters 108 provide no flexibility in defining custom expiration dates for replacement prepaid cards or reissue prepaid cards.

In an embodiment, the program expiration parameters 106 in the issuer card program file 100 also include custom acceptance parameters 112. The custom acceptance parameters 112 indicate whether one or more customized expiration parameters are accepted for a prepaid card issued under the issuer prepaid card program. The custom acceptance parameters 112 include a program custom expiration parameter 114, card replacement expiration parameter 116, grace period expiration parameter 118 and auto re-issuance expiration parameter 120. The program custom expiration parameter 114 indicates whether a customized expiration date is accepted for a prepaid card. The card replacement expiration parameter 116 indicates whether recalculation of an expiration date for a replacement prepaid card is accepted. The grace period expiration parameter 118 indicates whether a custom grace period for a replacement prepaid card is accepted when a replacement card is requested within a predetermined time period of its expiration date. The auto re-issuance expiration parameter 120 indicates whether a custom auto-reissuance period is accepted for determining expiration dates of prepaid cards that are re-issued under the issuer prepaid card program. Other custom acceptance parameters 112 may also be included in an issuer prepaid card program.

In an embodiment, the program expiration parameters 106 may also include expiration criteria 86. The expiration criteria 86 include predetermined criteria for the custom expiration parameters. For example the expiration criteria 86 may include a maximum card life cycle or other limits to the customized expiration parameters.

When the prepaid card processing system 12 receives a prepaid card order under the issuer prepaid card program file 100, it stores information about the prepaid card order in the database 44. This information is illustrated by the prepaid card order file 102 in FIG. 2. The prepaid card order file 102 may include data for program identification 82, program identification 84, order identification 122 and customer identification 124. The prepaid card order file 102 may also include a shipping address 126 for shipment of each prepaid card in the prepaid card order. The prepaid card order file 102 also includes a quantity 128 of prepaid cards desired by the customer under the prepaid card order. The quantity 128 may be one or more than one prepaid card. The prepaid card order file 102 may also include cardholder data 130 for each prepaid card. If the cardholder data 130 is not included in the prepaid card order, it may be provided to the prepaid card processing system 12 prior to activation of a prepaid card. The prepaid card order file 102 also includes one or more customized expiration parameters 132 received by the prepaid card processing system 12 for the prepaid card order under the issuer prepaid card program. When accepted, the one or more customized expiration parameters 132 are used by the prepaid card processing system 12 to determine an expiration date for any prepaid card in the prepaid card order. The one or more customized expiration parameters 132 override any applicable default expiration parameters 108 to determine the expiration date for any prepaid card in the prepaid card order.

The customized expiration parameters 132 include a customized expiration date 134, a customized recalculation parameter 136, a grace period 138 and an auto re-issuance period 140. The customized expiration date 134 may be a customized fixed expiration date 142 or a customized card life cycle 144. A fixed expiration date 142 is a specific date of the month and year or it can be just a month and a year. For example, the fixed expiration date 142 may be Jan. 31, 2010 or it can be January 2010. The customized card life cycle is a time period defined by any measurement unit of time. For example, the time period may be specified in a number of days or months or hours, such as 60 days or 2 months or 1440 hours. The customized recalculation parameter indicates whether an expiration date should be recalculated for a replacement prepaid card. It may also include a replacement customized card life cycle 156 and replacement customized card life cycle 154. The grace period 138 is a time period defined by any measurement unit of time that is used to extend an expiration date for a replacement prepaid card. The auto re-issuance period 140 is a fixed expiration date or a customized card life cycle that determines an expiration date for an auto re-issued prepaid card.

The prepaid card processing system 12 creates a set of card accounts for the prepaid cards requested in the prepaid card order in the database 44. The prepaid card processing system 12 stores information about a card account in the database 44. This information is illustrated by the card account file 104 in FIG. 2. The card account file may include data for program identification 82, program identification 84, order identification 122, customer identification 124 and account identification 146. The card account file 104 includes an expiration date 148 determined by the prepaid card processing system. In addition, the type of card 150 may be included in the card account file. For example, the type of card 150 may indicate if it is a first issued, re-issued or replacement card. In an embodiment, a card value 152 may also be included to track the balance of the funds on the prepaid card. In another embodiment, the card value 152 may be tracked by the issuer system 20 in addition to or alternatively to the prepaid card processing system 12. In an embodiment, the card account file 104 may also include the customized expiration parameters 132 applicable to the card account from the prepaid card order.

Though FIG. 2 illustrates an issuer card program file 100, card order file and card account file 104, the database 44 may store the data illustrated using other file formats or using other database structures.

Figure 3:
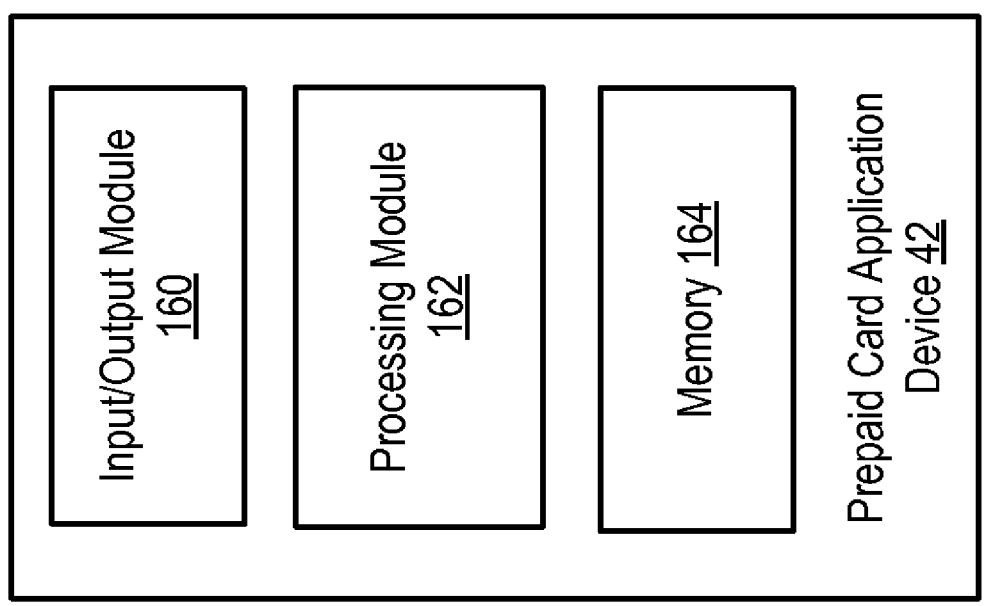
FIG. 3 is a schematic block diagram of an embodiment of a prepaid card application device in accordance with the present invention.

FIG. 3 is a schematic block diagram of an embodiment of the prepaid card application device 42 in accordance with the present invention. The prepaid card application device 42 includes an input/output (I/O) module 160, a processing module and a memory 164. In an embodiment, the prepaid card application device 42 includes one or more servers, computers or similar processing devices. In such an embodiment, the processing module 162 includes a central processing unit; the memory 164 includes system memory, cache memory, and read only memory; the I/O module 160 includes a graphical user interface and/or a peripheral device interface (e.g., to connect to a mouse, a keyboard, etc.) and a video card, printer card, etc. In general, the processing module 162 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 162 may have internal memory and/or is coupled to memory 164. Memory 164 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 164 stores, and the processing module 162 executes, hard coded and/or operational instructions corresponding to at least some of the steps and/or functions illustrated in FIGS. 1-9.

Figure 4:
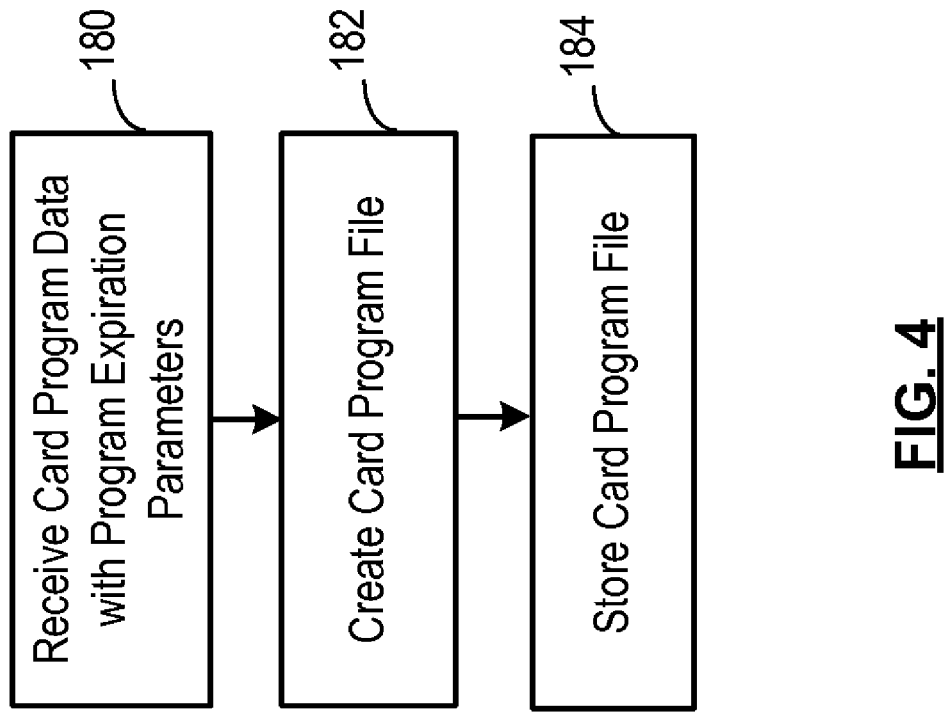
FIG. 4 is a logic diagram of an embodiment of a method for processing of prepaid card program data in accordance with the present invention.

FIG. 4 is a logic diagram of an embodiment of a method for processing of prepaid card program data in accordance with the present invention. The method begins at step 180 with receiving data about the prepaid card program. In general, the prepaid card program data is input at or received by the issuer system 20. The issuer system 20 transmits the prepaid card program data to the prepaid card processing system 12. When the prepaid card processing system 12 receives the prepaid card program data, it creates an issuer card program file 100 for the issuer prepaid card program as shown in step 182 of FIG. 4. The issuer card program file 100 is stored in the database 44. As seen in FIG. 2, the issuer card program file 100 includes the program expiration parameters. The issuer card program file 100 may also include other data needed for establishing the issuer prepaid card program with the prepaid card processing system 12.

FIG. 5 is a logic diagram of an embodiment of a method for processing the customized expiration parameters 132 in accordance with the present invention. In step 202, card order data such as the data in card order file 102 is received by the prepaid card processing system 12. The card order may be for one or more first issued prepaid cards, replacement cards or re-issued prepaid cards. In an embodiment, the PPCPS interface device 40 is a web server, and the issuer system 20 or a customer system 22, 24, 26 accesses a web page from the PPCPS interface device 40 to download a card order graphical user interface (GUI) in an HTML document. The issuer system 20 or a customer system 22, 24, 26 receives card order data inputs to the HTML document and transmits the card order data to the PPCPS interface device 40. In another embodiment, the card order data is received in a data file with a predetermined format recognized by the prepaid card processing system 12. The prepaid card processing system 12 receives the card order data which includes one or more customized expiration parameters 132 and stores the card order data in database 44, such as in the card order file 102. In step 204, the prepaid card application device 42 determines whether the program expiration parameters 106 indicate acceptance of the one or more customized expiration parameters 132.

In an embodiment, customized expiration parameters may only be received as part of a prepaid card order by the customer systems 22, 24, and 26 when the program expiration parameters indicate their acceptance. For example, the prepaid card order GUI downloaded from the prepaid card processing system 12 may only include options to receive and select customized expiration parameters when the program expiration parameters indicate their acceptance under the issuer prepaid card program for the customer. In another embodiment, the prepaid card order GUI may include options to select customized expiration parameters for each order regardless of whether the program expiration parameters indicate their acceptance. However, though the prepaid card processing system 12 may receive the customized expiration parameters, the customized expiration parameters are only processed by the prepaid card processing system 12 for the card order when the program expiration parameters indicate their acceptance. Similarly, in another embodiment, the customer systems 22, 24, 26 may receive and process a data file with prepaid card order data including customized expiration parameters. But again, though the prepaid card processing system 12 may receive the data file with customized expiration parameters 132, the customized expiration parameters 132 are only processed by the prepaid card processing system 12 for the prepaid card order when the program expiration parameters 106 indicate their acceptance.

When accepted, the prepaid card processing system 12 processes the customized expiration parameters in step 206 and determines whether the customized expiration parameters meet predetermined criteria in step 208. The predetermined criteria include the expiration criteria 86 and other system criteria. For example, the expiration criteria 86 may limit expiration dates to two years from the issuance date. If the customized expiration parameters 132 include a fixed expiration date 142 that is more than two years from the date of the card order, then the customized expiration parameters 132 would not meet the expiration criteria. In another example the expiration criteria 86 may provide for a minimum period to a fixed expiration, especially for mail order type prepaid cards. For example, the expiration criteria 86 may provide for a minimum of 10 days from a card order to a fixed expiration date for a mail order type prepaid card because processing, manufacture and shipment of a mail order type prepaid card may average 10 days. Thus, a fixed expiration date of 5 days for a mail order type card would not meet the expiration criteria 86.

When the customized expiration parameters fail to meet the predetermined criteria, then a warning message may be transmitted by the prepaid card processing system 12 that requests one or more revised customized expiration parameters 132. When the customized expiration parameters 132 fail to meet the predetermined criteria or no customized expiration parameters 132 are received in the card order data, the prepaid card application device 42 determines an expiration date of each prepaid card in the card order based on the default expiration parameters 108 under the issuer card program, as shown in step 210. When one or more of the customized expiration parameters 132 meet the predetermined criteria, the prepaid card application device 42 determines an expiration date of each prepaid card in the card order according to the one or more customized expiration parameters 132 as shown in step 212. The one or more customized expiration parameters 132 may indicate the expiration date for a prepaid card, a re-issue expiration date for reissuance of a prepaid card, a grace expiration period for a prepaid card, an auto re-issuance expiration period for a prepaid card, or a replacement expiration date for replacement of the prepaid card. Thus, the expiration date may apply to a prepaid card, a replacement prepaid card or an auto re-issued prepaid card.

The card processing module 12 creates or updates a card account file 104 in the database 44 for each prepaid card in the card order with the expiration date 148 determined by the prepaid card application device 42, as shown in step 214. For a replacement or auto-reissued prepaid card, a card account file 104 associated with the replacement or auto-reissued prepaid card may already exist. When a card account file 104 already exists, the card account file is updated with the new expiration date determined by the prepaid card application device 42, and the card type 150 may also be updated to indicate a replacement or reissued card type.

The prepaid card application device 42 determines in step 216 whether the card order is for an instant issue type prepaid card or a mail order type prepaid card. For an instant issue type prepaid card, the card order includes a shipment address to a commercial customer 22, 26 and the prepaid cards are issued to a commercial customer. For a mail order type prepaid card, cardholder data and shipping address for the cardholder is provided to the prepaid card processing system 12. When the prepaid card is not an instant issue card, the prepaid card processing system 12 provides data from the card account file 104 to an issuer system 20 to issue a prepaid card for the card account file 104 as shown in step 218. When processed and accepted, the issuer system 20 issues the prepaid card to a cardholder and may also establish a card bank account for each card account file 104, if not already created. In an embodiment, when acceptance is received by the prepaid card processing system 12, card manufacturing information for each card account file 104 is transmitted by the prepaid card processing system 12 to the card manufacturer system 28. The prepaid card is shipped to the cardholder by the card manufacturer system 28. When the prepaid card is received by the cardholder, the cardholder must activate the prepaid card by transmitting activation data to the prepaid card processing system 12. When the activation data is received by the prepaid card processing system 12 as shown in step 220, the prepaid card processing system 12 activates the prepaid card as shown in step 222.

When the prepaid card is an instant issue card, the prepaid card processing system 12 provides data from the card account file 104 to an issuer system 20 to issue a prepaid card for the card account file 104 as shown in step 224. When processed and accepted, the issuer system 20 issues the prepaid card to a commercial or merchant customer, such as customers 22 and 24. The issuer system 20 may also establish a card bank account for each card account file 104, if not already created. The customer 24, 26 or issuer system 20 transmits cardholder data for the issued prepaid card to the prepaid card processing system 12. When the cardholder data for the prepaid card is received by the prepaid card processing system 12 as shown in step 224, the prepaid card processing system 12 must determine whether the expiration date 148 for the prepaid card is greater than a predetermined time period as shown in step 228. When the expiration date 148 is less than a predetermined time period, then the card processing system may reject the activation as shown in step 230. For example, it may be determined that at least 2 days are required prior to expiration of a card for activation. Thus, a predetermined time period of 2 days may be set. When the cardholder data for a prepaid card is received on a date wherein the expiration date is less than 2 days away, the prepaid card processing module 12 may reject activation of the prepaid card as shown in step 230. When the expiration date 148 is greater than the predetermined time period, the card processing system updates the card account file 104 with the cardholder data as shown in step 232 and activates the prepaid card as shown in step 222.

Figure 6:
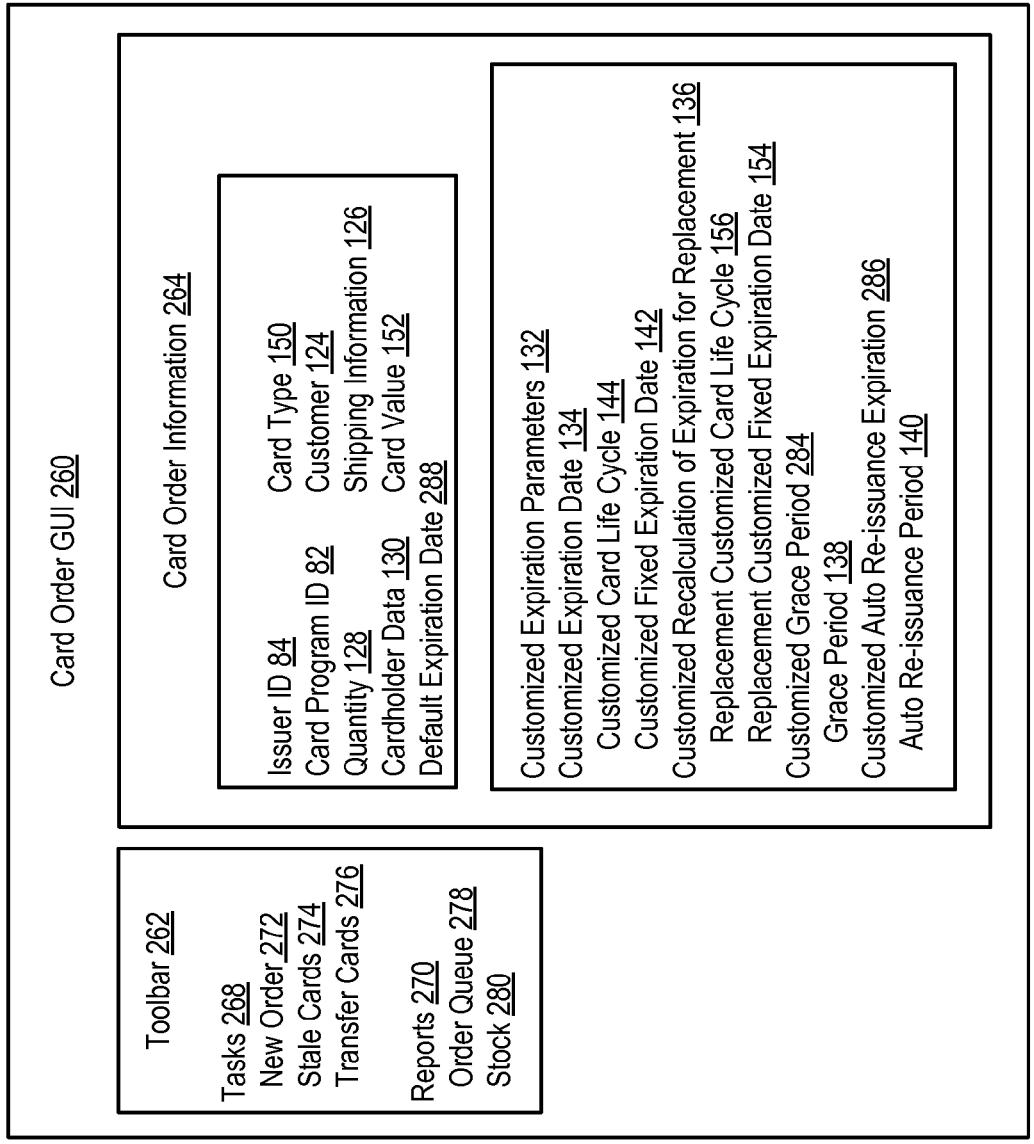
FIG. 6 is a schematic block diagram of an embodiment of a graphical user interface for receiving custom expiration parameters in accordance with the present invention.

FIG. 6 is a schematic block diagram of an embodiment of a card order graphical user interface (GUI) 260 for receiving custom expiration parameters in accordance with the present invention. In an embodiment, the card order GUI 260 is displayed using a web browser running on a customer device 48 or issuer device 46 that accesses a prepaid card order graphical user interface (GUI) program, such as HTML documents, downloaded from a web server at either the issuer system 20 or prepaid card processing system 12. The card order GUI 260 includes a toolbar 262 for selecting one or more different tasks 268 and reports 270. Other categories and options may also be provided by the toolbar 262. The different tasks 268 include new order 272. The new order task 272 is selected on the toolbar 262 such that the new card order GUI 264 is displayed. The card order GUI 260 includes fields for card order data including issuer identification 84, card program identification 82, customer identification 124, shipping information 126, quantity 128, cardholder data 130, card type 150 and card value 152. The card order GUI 260 also includes a field for default expiration date 282. The default expiration date 282 is determined from the default expiration parameters 108. Instead of or in addition to the default expiration date 282, the default expiration parameters 108 may be displayed as part of the card order GUI.

In an embodiment, the card order GUI 260 also includes fields for inputting one or more of the customized parameters 132. A field for the customized expiration date 134 provides for selection of a customized expiration date. When selected, a customized card life cycle 144 or customized fixed expiration date 142 may be selected as the customized expiration date 134. If not selected, default expiration date 282 will be determined based on the default expiration parameters 108. A field for the customized recalculation parameter 136 provides for selection of whether an expiration date should be recalculated for a replacement prepaid card. It may also include a replacement customized card life cycle 156 and replacement customized card life cycle 154. A field for customized grace period 284 provides for selection of a customized grace period. When selected, a grace period 138 may be selected. The grace period 138 is used to extend an expiration date for a replacement prepaid card when requested within a predetermined time period from the expiration date. A field for selection of a customized auto re-issuance period 286 provides for selection of an auto re-issuance period. When selected, an auto re-issuance period 140 may be selected. The auto re-issuance period 140 provides for a fixed expiration date or a customized card life cycle that determines an expiration date for an auto re-issued prepaid card.

In operation, the issuer device 46 or the customer device 48, 56, 64 are operable to display the card order GUI 260 and receive a selection of one or more of the customized expiration parameters 132 from the issuer or customer as part of the card order data. The selected one or more customized expiration parameters 132 are transmitted to the prepaid card processing system 12. Though FIG. 6 illustrates a card order GUI 260 for receiving one or more customized expiration parameters 132, other methods and systems may be used to receive the one or more customized expiration parameters. In another embodiment, the prepaid card order data is received using another type of program, such as a spreadsheet or other specialized program, and processed to create a data file. The data file is then transmitted to the prepaid card processing system 12. In another embodiment, a call center may collect card order data from a customer or issuer using voice communication or text communication and provide the prepaid card order data to the prepaid card processing system 12.

Figure 7:
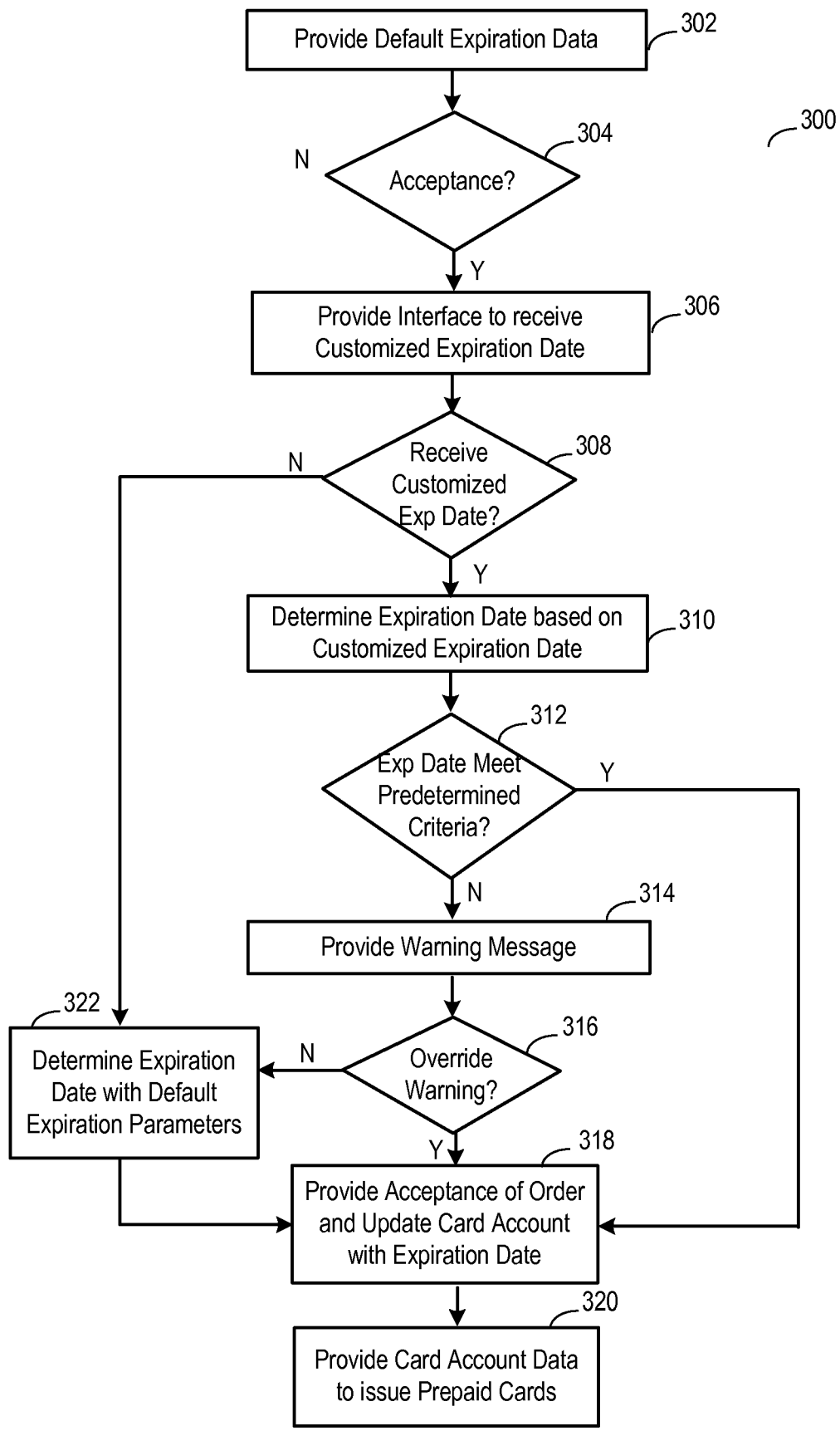
FIG. 7 is a logic diagram of an embodiment for a method for processing a custom expiration date for a prepaid card in accordance with the present invention.

FIG. 7 is a logic diagram of an embodiment for a method for processing a custom expiration date 134 to determine an expiration date for a prepaid card in accordance with the present invention. In step 302, default expiration date 282 or default expiration parameters 108 are determined by the prepaid card processing system 12 and transmitted to the customer 24, 26 or issuer 20. The default expiration parameters 108 only include one or more standard card life cycles 110, such as 6 months, 12 months or 18 months. The default expiration date 282 is determined based on the standard card life cycle 110 by adding the standard card life cycle 110 to the prepaid card order date, an issuance date or activation date to determine the expiration date. By viewing the default expiration parameters 108, the customer 24, 26 or issuer 20 may determine whether a customized expiration date 134 is preferred over the default expiration parameters 108.

In step 304, the prepaid card processing system 12 determines whether the program expiration parameters 106 indicate acceptance of a customized expiration date 134. The prepaid card processing system 12 accesses the issuer card program file 100 from the database 44 and determines whether the program custom expiration parameter 114 indicates acceptance of a customized expiration date 134. When not accepted, the prepaid card processing system 12 determines an expiration date 148 for a prepaid card account file 104 based on the default expiration parameters 108 as shown in step 322. When accepted, an interface, such as card order GUI 260 is provided to receive a customized expiration date 134. When no customized expiration date 134 is received, then the prepaid card processing system 12 determines an expiration date 148 based on the default expiration parameters 108 as shown in step 322. When a customized expiration date 134 is received, the prepaid card processing system 12 determines an expiration date 148 for the card account file 104 based on the customized expiration date 134 as shown in step 310. The customized expiration date 134 may be a customized card life cycle 144 or customized fixed expiration date 142. The customized card life cycle 144 may be selected for any time period and not just a time period provided in the standard card life cycle 110. The time period is then added to the card order date, issuance date or activation date to determine the expiration date 148. The customized fixed expiration date 142 is a specific day of a month and year or it may be just a month and a year. For example, the customized fixed expiration date 142 may be Jan. 31, 2010 or it may be January 2010.

In step 312, the prepaid card processing system 12 processes the expiration date 148 for the card account file 104 and determines whether the expiration date 148 meets predetermined criteria. The predetermined criteria include the expiration criteria 86 in the issuer card program file 100 or other system criteria. For example, the expiration criteria 86 may limit expiration dates to two years from the issuance date. If the expiration date 148 is more than two years from the date of the card order, then the expiration date 148 does not meet the expiration criteria. In another example the expiration criteria 86 may provide for a minimum period to the expiration date 148, especially for mail order type prepaid cards. For example, the expiration criteria 86 may provide for a minimum of 10 days from a card order to the expiration date 148 for a mail order type prepaid card because processing, manufacture and shipment of a mail order type prepaid card may average 10 days. Thus, an expiration date 148 of 5 days for a mail order type card would not meet the expiration criteria 86. The predetermined criteria may only be advisory. For example, the predetermined criteria may provide that an expiration date 148 that is 30 days from a card order may be allowed but a warning message is generated to advise the issuer 20 or customer 22, 24, 26 of the short expiration period.

When the expiration date 148 fails to meet the predetermined criteria, then a warning message is transmitted by the prepaid card processing system 12 that requests one or more revised customized expiration date 134 as shown in step 314. When the expiration date 148 fails to meet advisory criteria, the warning message may provide that an override of the warning is accepted. In step 316, when the customized expiration parameters 132 fail to meet the predetermined criteria and an override of the warning is not accepted or received, the prepaid card processing system 12 determines an expiration date 148 for the card account file 104 based on the default expiration parameters 108, as shown in step 322. When the expiration date 148 meets the predetermined criteria, the prepaid card processing system 12 provides acceptance of the card order and stores the expiration date 148 based on the custom expiration date 134 in the card account file 104, as shown in step 318. The prepaid card processing system 12 then provides data from the card account file 104 to an issuer system 20 to issue a prepaid card for the card account file 104 as shown in step 320.

Figure 8:
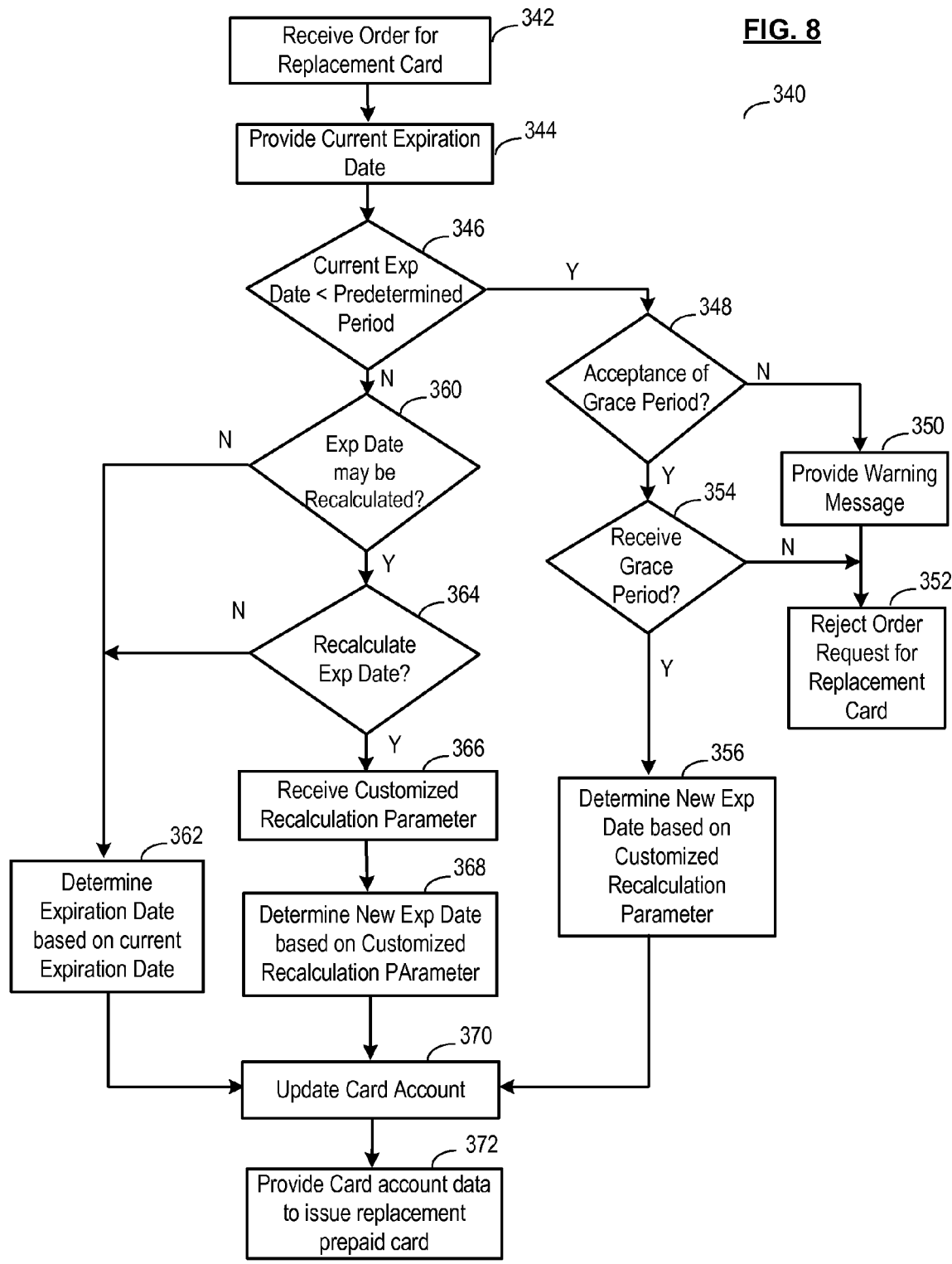
FIG. 8 is a logic diagram of an embodiment for a method for processing a custom expiration date for a replacement prepaid card.

FIG. 8 is a logic diagram of an embodiment for a method for processing a custom expiration date for a replacement prepaid card. When a prepaid card is lost or stolen or damaged, a request for a replacement card is received by the prepaid card processing system 12 in a prepaid card order as shown in step 342. The prepaid card order would include a card type 150 of "replacement" or "re-issue" and provide data to identify the card account file 104. When the prepaid card processing system 12 receives the request, it accesses the card account file 104 in the database 44 to retrieve the expiration date 148 for the prepaid card. The prepaid card processing system 12 provides the expiration date 148 in the card account file 104 to the customer 24, 26 or issuer 20. The prepaid card processing system 12 then determines whether the expiration date 148 is within a predetermined time period in step 346.

When the expiration date 148 is within a predetermined time period, such as 5 or 10 days, of the request for card replacement, then the request for card replacement is processed in a different manner. As shown in step 348, the prepaid card processing system 12 determines whether a grace period expiration parameter 118 in the issuer card program file 100 indicates acceptance of a grace period 138. When the grace period expiration parameter 118 in the issuer card program file 100 indicates that a grace period 138 is not accepted, a warning message is provided by the prepaid card processing system 12, as shown in step 350. The warning message advises the issuer 20 or customer 22, 24, 26 requesting a replacement card, that the request for a replacement card is rejected. The order request for a card replacement is then rejected, as shown in step 352. The prepaid card processing system 12 determines the predetermined time period for example based on a time to process the request for a replacement card, manufacturer the replacement card and ship the replacement card. If no grace period is accepted, and the expiration date is less than the predetermined time period, then the request is rejected because the replacement card may not be received or activated by a cardholder before the expiration date 148.

When the grace period expiration parameter 118 in the issuer card program file 100 indicates that a grace period 138 is accepted for the card account file 104, the prepaid card processing system 12 receives a grace period 138. In an embodiment, the grace period 138 may have been received prior to the card replacement request in a previous prepaid card order and stored in the card order file 102 or card account file 104 associated with the prepaid card. The prepaid card processing system 12 may then retrieve the grace period 138 from the card order file 102 or card account file 104. In another embodiment, the prepaid card processing system 12 provides an interface, such a card order GUI to enter the grace period 138 for the card replacement. The prepaid card processing system 12 then determines a new expiration date for the replacement card based on the grace period 138. For example, the grace period 138 may be added to the expiration date 148 to determine the new expiration date. The new expiration date is stored in the card account file 104 as the expiration date 148. The type of card 150 may also be updated to indicate a replacement card. The prepaid card processing system 12 then provides data from the updated card account file 104 to the issuer system 20 to issue a replacement prepaid card for the card account file 104 as shown in step 372.

Referring to step 346 in FIG. 8, when the expiration date 148 is not less than a predetermined time period, then the processing of the request for card replacement determines whether the card replacement expiration parameter 116 in the issuer card program file 100 indicates acceptance of recalculation of an expiration date for a replacement card. When not accepted, then the new expiration date for the replacement card is based on the current expiration date 148 in the card account file 104, as shown in step 362. When accepted, the prepaid card processing system 12 determines whether to recalculate the expiration date from the customized recalculation of expiration parameter 136, as shown in step 364. In an embodiment, the customized recalculation of expiration parameter 136 may have been received prior to the card replacement request in a previous prepaid card order and stored in the card order file 102 or card account file 104 associated with the prepaid card. The prepaid card processing system 12 may then retrieve the customized recalculation of expiration parameter 136 from the card order file 102 or card account file 104. In another embodiment, the prepaid card processing system 12 provides an interface, such a card order GUI to enter the customized recalculation of expiration parameter 136 for the card replacement request. In both embodiments, the prepaid card processing system 12 receives the customized recalculation of expiration parameter 136. When the customized recalculation of expiration parameter 136 indicates no recalculation for a replacement card under the card account 104, the prepaid card processing system 12 determines the new expiration date for the replacement card based on the current expiration date 148 in the card account file 104, as shown in step 362.

When the customized recalculation of expiration parameter 136 indicates recalculation for a replacement card under the card account 104, the prepaid card processing system 12 determines a new expiration date for the replacement card, as shown in step 368. For a card account file 104 with a customized fixed expiration date, the prepaid card processing system 12 may provide for an interface to the issuer 20 or customer 22, 24 to select a new replacement customized fixed expiration date 154, such as shown in the card order GUI 260. Certain predetermined criteria may be required for the new customized fixed expiration date. For example, the new customized fixed expiration date may not be more than the time period between the request for a replacement card and the current expiration date. The prepaid card processing system 12 may also allow for the grace period 138 to be added to the time period, such as 10 days, to compensate for processing, manufacturing and shipping time. For example, if the expiration date 148 in the card account file 104 for the prepaid card was only 30 days from the request for a replacement card, then the new expiration date may not be more than 30 days place the grace period or 40 days from the request for a replacement card.

For a card account file 104 with an expiration date 148 based on a customized card life cycle, the prepaid card processing system 12 may provide for an interface to the issuer 20 or customer 22, 24 to select a new replacement customized card life cycle as shown on card order GUI 260 for the replacement card. In another embodiment, an expiration date for the replacement card may be recalculated based on the current customized card life cycle. Certain predetermined criteria may be required for the new expiration date based on the customized card life cycle. For example, the predetermined criteria may specify that the elapsed time of the original prepaid card and the new customized card life cycle may not be more than the maximum card life cycle for a prepaid card under the issuer card program. For example, when the expiration criteria 86 defines a maximum life cycle for a prepaid card at two years and the original prepaid card has been issued for thirteen months, the new customized card life cycle may not exceed eleven months. The prepaid card processing system 12 may also allow for the grace period 138 to be added to the time period, such as 10 days, to compensate for processing, manufacturing and shipping time.

The new expiration date for the replacement card is stored in the card account file 104 as the expiration date 148, as shown in step 370. The type of card 150 may also be updated to indicate a replacement card. The prepaid card processing system 12 then provides data from the updated card account file 104 to the issuer system 20 to issue a replacement prepaid card for the card account file 104 as shown in step 372.

Figure 9:
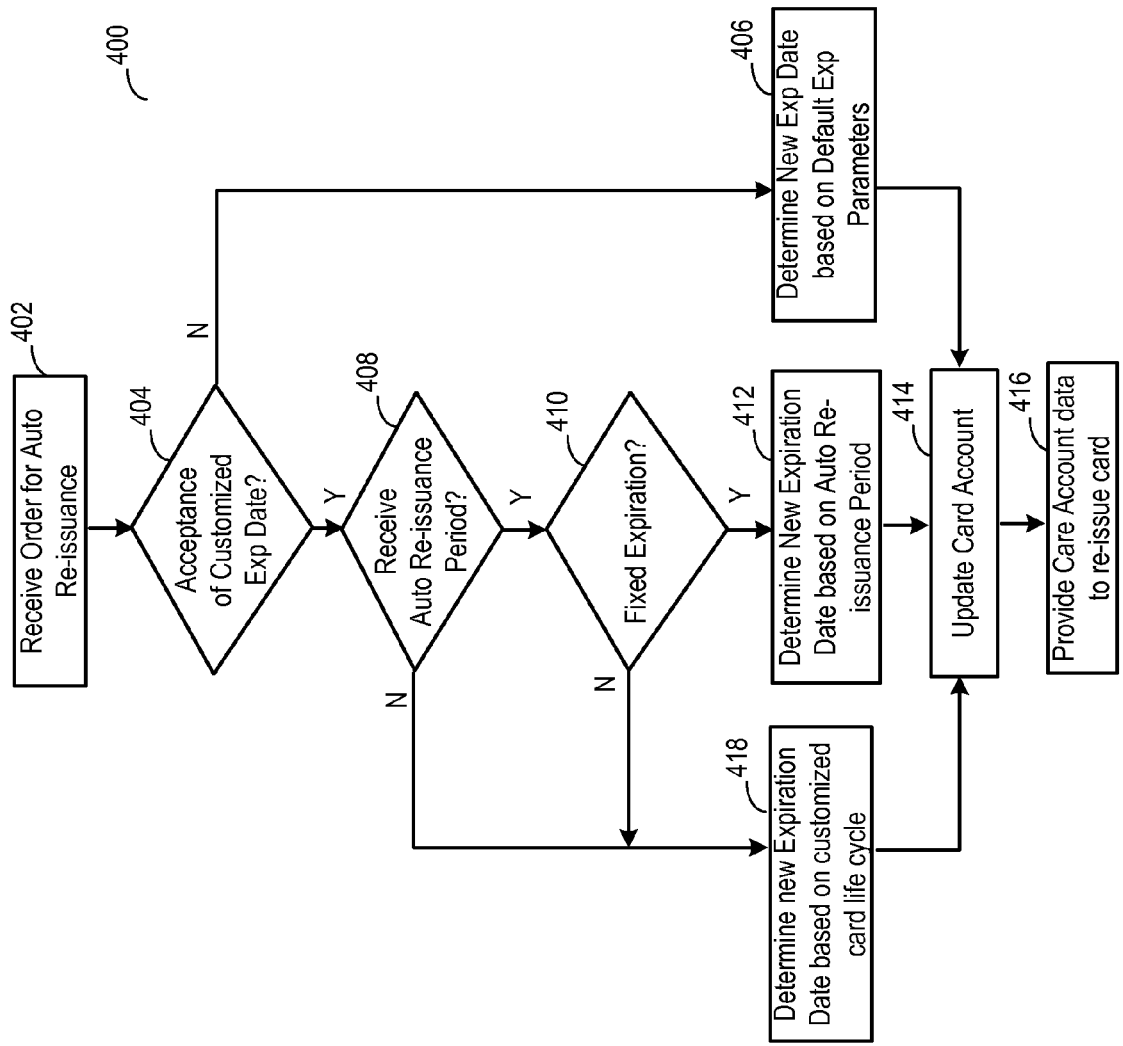
FIG. 9 is a logic diagram of an embodiment for a method for processing custom expiration dates during auto re-issuance for a prepaid card.

FIG. 9 is a logic diagram of an embodiment for a method for processing custom expiration dates during auto re-issuance for a prepaid card. A prepaid card at expiration may auto re-issue according to options and criteria defined by the issuer system 20. In step 402, the prepaid card processing system 12 receives a request from the issuer system 20 or customers 22, 24, 26 for auto re-issuance of a prepaid card. The request includes a card type 150 of "re-issue" and provides data to identify the card account file 104. The prepaid card processing system 12 accesses the issuer card program file 100 associated with the prepaid card and determines whether the auto re-issuance expiration parameter 120 in the issuer card program file 100 indicates acceptance of a customized auto-reissuance period 140. When not accepted, the prepaid card processing system 12 determines an expiration date 148 for the re-issued prepaid card based on the standard card life cycle 110 or other default expiration parameters 108 as shown in step 406.

When accepted, an interface, such as card order GUI 260 is provided to receive a customized auto re-issuance period 140. In an embodiment, the customized auto re-issuance period may have been received prior to the prepaid card re-issue request in a previous prepaid card order and stored in the card order file 102 or card account file 104 associated with the prepaid card. The prepaid card processing system 12 may then retrieve the customized auto re-issuance period from the card order file 102 or card account file 104. In another embodiment, the prepaid card processing system 12 provides an interface, such a card order GUI to enter the customized auto re-issuance period for the prepaid card re-issue request. In both embodiments, the prepaid card processing system 12 determines whether a customized auto re-issuance period is received, as shown in step 408. When no customized auto re-issuance period 140 is received, then the prepaid card processing system 12 determines an expiration date 148 for the re-issued prepaid card based on the default expiration parameters 108 as shown in step 406.

When a customized auto re-issuance period 140 is received, the prepaid card processing system 12 determines whether the expiration date 148 for the prepaid card is based on a customized fixed expiration date, as shown in step 410. In an embodiment, the customized auto re-issuance period 140 is only used only to determine a new expiration date to re-issue a prepaid card with a customized fixed expiration date 142. When a prepaid card with a customized fixed expiration date 142 is re-issued, the prepaid card processing system 12 determines the new expiration date by adding the customized auto re-issuance period 140, as shown in step 412. For example, if the customized auto re-issuance period 140 is 60 days then the new re-issued card will have an expiration date determined by the customized fixed expiration date 148 of the prepaid card plus 60 days. When a prepaid card with a customized card life cycle 144 is re-issued, the prepaid card processing system 12 determines the new expiration date based on the customized card life cycle 144, as shown in step 418. For example, if a prepaid card was issued with a customized card life cycle of 6 months, then the re-issued prepaid will have a new expiration date that is 6 months from the date of the previous expiration date for the prepaid card.

In another embodiment of the invention, the customized auto re-issuance period 140 may also be used to determine a new expiration date for a prepaid card with an expiration date based on the customized card life cycle 144. In this embodiment, the prepaid card processing system 12 determines the new expiration date for the re-issued card based on the customized auto re-issuance period. For example, if a prepaid card was issued with a customized card life cycle of 6 months and the customized auto re-issuance period is 7 months, then the re-issued prepaid will have a new expiration date that is 7 months from the date of the previous expiration date for the prepaid card.

The new expiration date for the re-issued prepaid card is stored in the card account file 104 as the expiration date 148, as shown in step 414. The type of card 150 may also be updated to indicate a re-issued prepaid card. The prepaid card processing prepaid card processing system 12 then provides data from the updated card account file 104 to the issuer system 20 to issue a replacement prepaid card for the card account file 104 as shown in step 416.

The embodiment of the present invention provides greater flexibility to an issuer 20 and customers 22, 24, 26 to configure the expiration date for a prepaid card, the expiration date for a replacement of the prepaid card and an expiration date for auto re-issuance of the prepaid card. Prepaid cards issued under an issuer card program are no longer subject to only the default expiration parameters established by the issuer 20 for the prepaid card program. The flexibility in determining expiration dates for a prepaid card, a replacement prepaid card and a re-issued prepaid card is not only at a customer level, but the customized expiration parameters may differ between prepaid card orders from a customer. This flexibility under a prepaid card program is advantageous for new customers or new uses for a prepaid card or for orders with different needs from a customer.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may still further be used herein, the term "associated with", includes direct and/or indirect association of separate data and/or one data being embedded within another item.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method for processing expiration dates of prepaid cards, comprising:

receiving program expiration parameters for an issuer prepaid card program;

receiving one or more customized expiration parameters for a prepaid card in a prepaid card order under the issuer prepaid card program;

determining an expiration date for the prepaid card based on the one or more customized expiration parameters in accordance with the program expiration parameters;

determining a second expiration date for a replacement of the prepaid card when indicated by a customized recalculation parameter and when the program expiration parameters indicate acceptance of the customized recalculation parameter, wherein the second expiration date is determined based on:

a replacement customized fixed expiration date if the expiration date of the prepaid card is derived from a customized fixed expiration date; and a replacement customized card life cycle if the expiration date of the prepaid card is derived from a customized card life cycle; and processing a card account file for the prepaid card to store the expiration dates for the prepaid card.

2. The method of claim 1, further comprising:

determining the expiration date for the prepaid card according to default expiration parameters when the program expiration parameters indicate that the one or more customized expiration parameters are not accepted.

3. The method of claim 1, wherein determining the expiration date for the prepaid card based on the one or more customized expiration parameters in accordance with the program expiration parameters, comprises:

determining the expiration date for the prepaid card is the customized fixed expiration date when the program expiration parameters indicate acceptance of a customized fixed expiration date.

4. The method of claim 1, wherein determining the expiration date for the prepaid card based on the one or more customized expiration parameters in accordance with the program expiration parameters, comprises:

determining the expiration date for the prepaid card is equal to the customized card life cycle from an issue date of the prepaid card when the program expiration parameters indicate acceptance of a customized card life cycle.

5. The method of claim 1, wherein determining the expiration date for the prepaid card based on the one or more customized expiration parameters in accordance with the program expiration parameters, comprises:

determining the expiration date for the prepaid card based on the one or more customized expiration parameters when the program expiration parameters indicate acceptance of the one or more customized expiration parameters and the one or more customized expiration parameters meet predetermined criteria.

6. The method of claim 1, wherein the second expiration date for a replacement of the prepaid card is determined based on a grace period when the program expiration parameters indicate acceptance of the grace period.

7. The method of claim 6, wherein the second expiration date is determined by adding the grace period to the expiration date.

8. The method of claim 1, wherein the second expiration date for a re-issuance of the prepaid card is determined based on an auto re-issuance period when the program expiration parameters indicate acceptance of the auto re-issuance period.

9. The method of claim 8, wherein the second expiration date is determined by adding the auto re-issuance period to the expiration date.

10. A prepaid card processing system, comprising:

a memory;

a processor disposed in communication with said memory, and configured to issue a plurality of processing instructions stored in the memory, wherein the processor issues instructions to:

obtain program expiration parameters for an issuer prepaid card program;

obtain one or more customized expiration parameters for a prepaid card in a prepaid card order under the issuer prepaid card program;

determine the expiration date for the prepaid card associated with a card account based on the program expiration parameters when one of the customized expiration parameters is a customized expiration date for the prepaid card; and determine a second expiration date for a replacement of the prepaid card associated with the card account when one of the customized expiration parameters is a customized recalculation parameter for recalculating the expiration date for the replacement of the prepaid card, wherein the second expiration date is determined based on:

a replacement customized fixed expiration date if the expiration date of the prepaid card is derived from a customized fixed expiration date; and a replacement customized card life cycle if the expiration date of the prepaid card is derived from a customized card life cycle; and process the card account file for the prepaid card to store the expiration dates for the prepaid card.

11. The prepaid card processing system of claim 10, wherein the program expiration parameters indicate whether the one or more customized expiration parameters are accepted for a set of card accounts created under the issuer prepaid card program.

12. The prepaid card processing system of claim 11, wherein the one or more customized expiration parameters comprise at least one of:

a grace period, wherein the grace period determines a second expiration date for a replacement of the prepaid card issued within a predetermined time period before the expiration date of the prepaid card; and an auto re-issuance period, wherein the auto re-issuance period determines a reissued expiration date for a re-issuance of the prepaid card.

13. The prepaid card processing system of claim 12, further comprising:

an interface device for communicating with an issuer system and a customer system.

14. The prepaid card processing system of claim 13, wherein the interface device is operable to communicate via a graphical user interface for receiving the program expiration parameters and the customized expiration parameters.

15. A method for providing customized expiration dates of prepaid cards, comprising:

transmitting program expiration parameters to establish a prepaid card program, wherein the program expiration parameters include default expiration parameters and custom acceptance parameters;

transmitting a prepaid card order with one or more customized expiration parameters for a prepaid card for issuance in accordance with the prepaid card program, wherein the customized expiration parameters include:

a customized expiration date for determining an expiration date for the prepaid card;

a customized recalculation parameter for recalculating an expiration date for a replacement of the prepaid card;

a grace period for determining a new expiration date for a replacement of the prepaid card; and an auto re-issuance period for determining a new expiration date for a re-issuance of the prepaid card.

16. The method of claim 15, wherein the custom acceptance parameters comprise two or more of:

a program custom expiration parameter that indicates whether a customized expiration date may be accepted for the prepaid card;

a card replacement expiration parameter that indicates whether customized expiration dates may be recalculated for a replacement of the prepaid card;

a grace period expiration parameter that indicates whether a grace period may be customized for a replacement of the prepaid card; and an auto re-issuance expiration parameter that indicates whether an expiration date may be customized for auto re-issuance of the prepaid card.

17. The method of claim 15, further comprising:

receiving a warning message in response to one or more of the customized expiration parameters not meeting a predetermined criteria.

18. A method for ordering prepaid cards with customized expiration parameters, comprising:

accessing an interface of a prepaid card processing system;

transmitting a prepaid card order under an issuer prepaid card program including customized expiration parameters, wherein the customized expiration parameters override default expiration parameters for the issuer prepaid card program to determine an expiration date of a prepaid card requested in the prepaid card order;

receiving a prepaid card from the card order, wherein the expiration date of the card is determined from the customized expiration parameters;

transmitting cardholder data associated with the prepaid card from the card order;

when a number of days to the expiration date of the prepaid card is greater than a predetermined time period, receiving a confirmation of activation of the prepaid card; and when a number of days to the expiration date of the prepaid card is less than a predetermined time period, receiving a rejection of activation of the prepaid card.

19. The method of claim 18, further comprising:

receiving a warning message in response to one or more of the customized expiration parameters not meeting predetermined criteria; and transmitting an override to the warning message.

20. The method of claim 18, wherein the customized expiration parameters comprise:

a customized expiration date, wherein the customized expiration date defines an expiration date for the prepaid card;

a customized recalculation parameter, wherein the customized recalculation parameter indicates that an expiration date should be recalculated for a replacement of the prepaid card;

a grace period, wherein the grace period indicates a new expiration date for a replacement of the prepaid card; and an auto re-issuance period, wherein the auto re-issuance period defines a new expiration date for a re-issuance of the prepaid card.

21. A processor-readable medium storing processor-issuable instructions to:

receive program expiration parameters for an issuer prepaid card program;

receive one or more customized expiration parameters for a prepaid card in a prepaid card order under the issuer prepaid card program;

determine an expiration date for the prepaid card based on the one or more customized expiration parameters in accordance with the program expiration parameters;

determine a second expiration date for a replacement of the prepaid card when indicated by a customized recalculation parameter and when the program expiration parameters indicate acceptance of the customized recalculation parameter, wherein the second expiration date is determined based on:

a replacement customized fixed expiration date if the expiration date of the prepaid card is derived from a customized fixed expiration date; and a replacement customized card life cycle if the expiration date of the prepaid card is derived from a customized card life cycle; and process a card account file for the prepaid card to store the expiration dates for the prepaid card.

22. A prepaid card processing apparatus, comprising:

a memory;

a processor disposed in communication with said memory, and configured to issue a plurality of processing instructions stored in the memory, wherein the processor issues instructions to:

receive program expiration parameters for an issuer prepaid card program;

receive one or more customized expiration parameters for a prepaid card in a prepaid card order under the issuer prepaid card program;

determine an expiration date for the prepaid card based on the one or more customized expiration parameters in accordance with the program expiration parameters;

determine a second expiration date for a replacement of the prepaid card when indicated by a customized recalculation parameter and when the program expiration parameters indicate acceptance of the customized recalculation parameter, wherein the second expiration date is determined based on:

a replacement customized fixed expiration date if the expiration date of the prepaid card is derived from a customized fixed expiration date; and a replacement customized card life cycle if the expiration date of the prepaid card is derived from a customized card life cycle; and process a card account file for the prepaid card to store the expiration dates for the prepaid card.

23. A system for providing customized expiration dates of prepaid cards, comprising:

a memory;

a processor disposed in communication with said memory, and configured to issue a plurality of processing instructions stored in the memory, wherein the processor issues instructions to:

transmit program expiration parameters to establish a prepaid card program, wherein the program expiration parameters include default expiration parameters and custom acceptance parameters;

transmit a prepaid card order with one or more customized expiration parameters for a prepaid card for issuance in accordance with the prepaid card program, wherein the customized expiration parameters include:

a customized expiration date for determining an expiration date for the prepaid card;

a customized recalculation parameter for recalculating an expiration date for a replacement of the prepaid card;

a grace period for determining a new expiration date for a replacement of the prepaid card; and an auto re-issuance period for determining a new expiration date for a re-issuance of the prepaid card.

24. A processor-readable medium storing processor-issuable instructions to:
- transmit program expiration parameters to establish a prepaid card program, wherein the program expiration parameters include default expiration parameters and custom acceptance parameters;
- transmit a prepaid card order with one or more customized expiration parameters for a prepaid card for issuance in accordance with the prepaid card program, wherein the customized expiration parameters include:
  - a customized expiration date for determining an expiration date for the prepaid card;
  - a customized recalculation parameter for recalculating an expiration date for a replacement of the prepaid card;
  - a grace period for determining a new expiration date for a replacement of the prepaid card; and
  - an auto re-issuance period for determining a new expiration date for a re-issuance of the prepaid card.

25. An apparatus for providing customized expiration dates of prepaid cards, comprising:
- a memory;
- a processor disposed in communication with said memory, and configured to issue a plurality of processing instructions stored in the memory, wherein the processor issues instructions to:
  - transmit program expiration parameters to establish a prepaid card program, wherein the program expiration parameters include default expiration parameters and custom acceptance parameters;
  - transmit a prepaid card order with one or more customized expiration parameters for a prepaid card for issuance in accordance with the prepaid card program, wherein the customized expiration parameters include:
    - a customized expiration date for determining an expiration date for the prepaid card;
    - a customized recalculation parameter for recalculating an expiration date for a replacement of the prepaid card;
    - a grace period for determining a new expiration date for a replacement of the prepaid card; and
    - an auto re-issuance period for determining a new expiration date for a re-issuance of the prepaid card.

26. A prepaid card ordering system, comprising:
- a memory;
- a processor disposed in communication with said memory, and configured to issue a plurality of processing instructions stored in the memory, wherein the processor issues instructions to:
  - access an interface of a prepaid card processing system;
  - transmit a prepaid card order under an issuer prepaid card program including customized expiration parameters, wherein the customized expiration parameters override default expiration parameters for the issuer prepaid card program to determine an expiration date of a prepaid card requested in the prepaid card order;
  - receive a prepaid card from the card order, wherein the expiration date of the card is determined from the customized expiration parameters;
  - transmit cardholder data associated with the prepaid card from the card order;
  - when a number of days to the expiration date of the prepaid card is greater than a predetermined time period, receive a confirmation of activation of the prepaid card; and
  - when a number of days to the expiration date of the prepaid card is less than a predetermined time period, receive a rejection of activation of the prepaid card.

27. A processor-readable medium storing processor-issuable instructions to:
- access an interface of a prepaid card processing system;
- transmit a prepaid card order under an issuer prepaid card program including customized expiration parameters, wherein the customized expiration parameters override default expiration parameters for the issuer prepaid card program to determine an expiration date of a prepaid card requested in the prepaid card order;
- receive a prepaid card from the card order, wherein the expiration date of the card is determined from the customized expiration parameters;
- transmit cardholder data associated with the prepaid card from the card order;
- when a number of days to the expiration date of the prepaid card is greater than a predetermined time period, receive a confirmation of activation of the prepaid card; and
- when a number of days to the expiration date of the prepaid card is less than a predetermined time period, receive a rejection of activation of the prepaid card.

28. A prepaid card ordering apparatus, comprising:
- a memory;
- a processor disposed in communication with said memory, and configured to issue a plurality of processing instructions stored in the memory, wherein the processor issues instructions to:
  - transmit a prepaid card order under an issuer prepaid card program including customized expiration parameters, wherein the customized expiration parameters override default expiration parameters for the issuer prepaid card program to determine an expiration date of a prepaid card requested in the prepaid card order;
  - receive a prepaid card from the card order, wherein the expiration date of the card is determined from the customized expiration parameters;
  - transmit cardholder data associated with the prepaid card from the card order;
  - when a number of days to the expiration date of the prepaid card is greater than a predetermined time period, receive a confirmation of activation of the prepaid card; and
  - when a number of days to the expiration date of the prepaid card is less than a predetermined time period, receive a rejection of activation of the prepaid card.

* * * * *